United States Patent
Kang et al.

(10) Patent No.: US 8,315,257 B2
(45) Date of Patent: Nov. 20, 2012

(54) APPARATUS AND METHOD FOR TRANSMITTING VOICE PACKET IN WIRELESS COMMUNICATION NETWORK

(75) Inventors: Hee-Won Kang, Seongnam-si (KR); Hwa-Sun You, Suwon-si (KR); Young-Bo Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 654 days.

(21) Appl. No.: 12/274,129

(22) Filed: Nov. 19, 2008

(65) Prior Publication Data
US 2009/0135774 A1 May 28, 2009

(30) Foreign Application Priority Data
Nov. 22, 2007 (KR) .................. 10-2007-0119855

(51) Int. Cl.
*H04L 12/28* (2006.01)
*H04L 12/56* (2006.01)

(52) U.S. Cl. .................. 370/389; 370/401; 455/422.1; 714/4

(58) Field of Classification Search ............ 370/389, 370/401
See application file for complete search history.

(56) References Cited

U.S. PATENT DOCUMENTS

| | | | |
|---|---|---|---|
| 6,490,256 B1* | 12/2002 | Jones et al. | 370/277 |
| 2005/0005189 A1* | 1/2005 | Khermosh et al. | 714/4 |
| 2007/0110087 A1* | 5/2007 | Abel et al. | 370/412 |
| 2007/0201462 A1* | 8/2007 | Ilan | 370/389 |
| 2008/0014915 A1* | 1/2008 | Usuda et al. | 455/422.1 |
| 2008/0025300 A1* | 1/2008 | Lide et al. | 370/389 |

OTHER PUBLICATIONS

MBFDD and MBTDD Wideband Mode: Technology Overview, IEEE 802.20 Working Group on Mobile Broadband Wireless Access <http://ieee802.org/20/>, Jan. 6, 2006.

* cited by examiner

*Primary Examiner* — Jianye Wu
*Assistant Examiner* — Wanda Z Russell
(74) *Attorney, Agent, or Firm* — Jefferson IP Law, LLP

(57) ABSTRACT

An apparatus and method for transmitting a voice packet in a wireless communication network are provided. The method includes generating voice data of a fixed length, which includes a voice packet having a length that is determined according to a rate of the voice packet, and a Forward Error Correction (FEC) code, and transmitting the generated voice data through a fixed resource.

16 Claims, 4 Drawing Sheets

APPARATUS AND METHOD FOR TRANSMITTING VOICE PACKET IN WIRELESS COMMUNICATION NETWORK

PRIORITY

This application claims the benefit under 35 U.S.C. §119(a) of a Korean patent application filed on Nov. 22, 2007 in the Korean Intellectual Property Office and assigned Serial No. 10-2007-0119855, the entire disclosure of which is hereby incorporated by reference.

BACKGROUND OF THE INVENTION

1. Field of the Invention

The present invention relates to a voice packet transmission in a wireless communication network. More particularly, the present invention relates to a system and method for efficiently transmitting a voice packet to a receiving apparatus, to which a fixed resource is allocated, by a transmitting apparatus.

2. Description of the Related Art

A wireless communication service includes a voice service and a data service. The voice service is based on circuit switching, and thus employs a resource allocation scheme in which a fixed resource is allocated to a specific mobile station at call setup. In addition, the data service is based on packet switching, and thus employs a resource allocation scheme in which a resource is dynamically allocated to a specific mobile station while a session is maintained. With the ongoing development of wireless communication technology, the voice service may now also use the same resource allocation scheme as that used for the data service, and such a resource allocation scheme for the voice service includes various resource allocation methods. Among these various resource allocation methods, a first resource allocation method is a resource allocation method for variable resource allocation, in which a base station transmits resource allocation information to a mobile station in each resource allocation cycle, and the mobile station detects a resource allocated thereto by using the resource allocation information transmitted in each resource allocation cycle and performs a voice service by using the detected resource. A second resource allocation method is a resource allocation method for fixed resource allocation, in which a base station transmits resource allocation information to a mobile station only once at call setup, and the mobile station detects a fixed resource allocated thereto by using the transmitted resource allocation information and performs a voice service by using the detected fixed resource until the resource allocation is released. Here, resource allocation information refers to information indicating an area in which a resource allocated to a mobile station is located.

However, the first resource allocation method has a problem in that when the same resource is continuously allocated to a mobile station, system overhead increases because the same resource allocation information is repeatedly transmitted.

In addition, the second resource allocation method has a problem in that when there is temporarily or intermittently no voice packets to be transmitted through a resource fixedly allocated to a mobile station, the resource is wasted because no other mobile station can use the corresponding resource.

Therefore, there is a need to provide a resource allocation scheme for reducing system overhead due to repeated transmission of the same resource allocation information and preventing a waste of resources of a voice service.

SUMMARY OF THE INVENTION

An aspect of the present invention is to address at least the above-mentioned problems and/or disadvantages and to provide at least the advantages described below. Accordingly, an aspect of the present invention is to provide an apparatus and method for transmitting a voice packet in a wireless communication network, which reduces system overhead due to repeated transmission of resource allocation information, and prevents a waste of resources of a voice service.

In accordance with an aspect of the present invention, a method of transmitting a packet in a wireless communication network is provided. The method including the generating voice data of a fixed length, which includes a voice packet having a length that is determined according to a rate of the voice packet, and a Forward Error Correction (FEC) code, and transmitting the generated voice data through a fixed resource.

In accordance with another aspect of the present invention, an apparatus for transmitting a packet in a wireless communication network is provided. The apparatus includes a voice data generator for generating voice data of a fixed length, which includes a voice packet having a length that is determined according to a rate of the voice packet, and an FEC code, and a transmitter for transmitting the generated voice data through a fixed resource.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Figure 1:
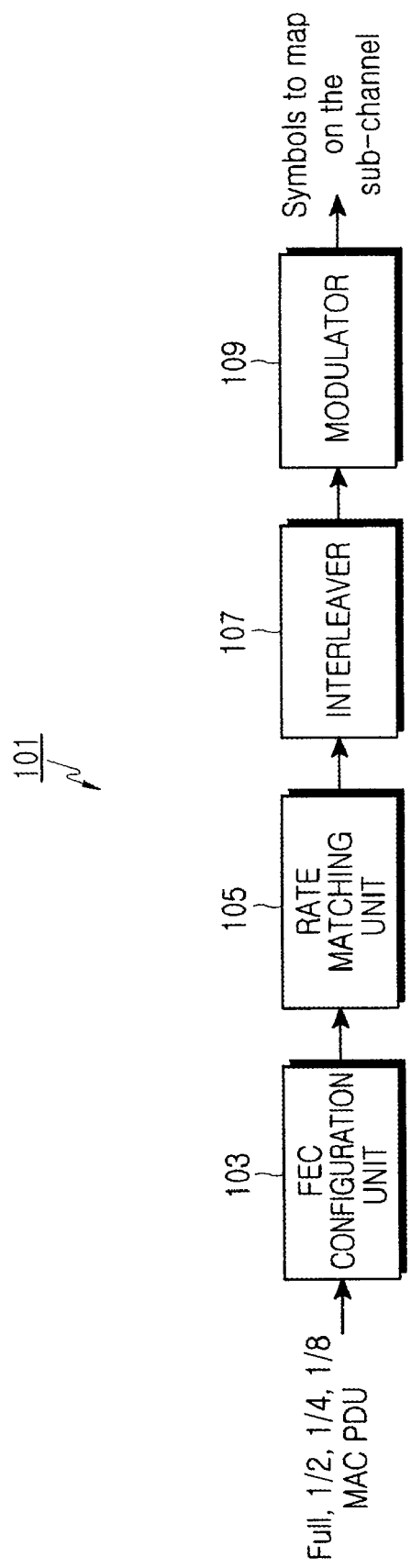
FIG. 1 is a block diagram illustrating a structure of an apparatus for transmitting a voice packet in a wireless communication network in accordance with a first exemplary embodiment of the present invention.

FIG. 1 illustrates a structure of a transmitting apparatus for voice packet transmission in a wireless communication network according to a first exemplary embodiment of the present invention. Referring to FIG. 1, the transmitting apparatus 101 includes a Forward Error Correction (FEC) configuration unit 103, a rate matching unit 105, an interleaver 107, and a modulator 109. In FIG. 1, it is assumed that the transmitting apparatus 101 allocates a fixed resource to a receiving apparatus, and transmits a voice packet to the receiving apparatus through the allocated fixed resource. Reference will now be made to the respective constituent elements of the transmitting apparatus 101. The FEC configuration unit 103 adds an FEC code for transmission error detection and correction to a Media Access Control Packet Data Unit (MAC PDU) including an input voice packet. Here, a MAC PDU with an FEC code added thereto is referred to as voice data. More particularly, the FEC configuration unit 103 adds an FEC code of a fixed length to a MAC PDU, and variably adjusts the length of the MAC PDU according to the rate of a voice packet included therein. More specially, when a voice packet has a high rate, for example, a rate of 1, there is substantially no fixed resource that is wasted, and thus the FEC configuration unit 103 maintains the length of a MAC PDU in its entirety. In contrast, when a voice packet has a low rate, for example, a rate of ⅛, ¼, or ½, there occurs a fixed resource that is wasted without actually carrying a voice packet, and thus the FEC configuration unit 103 increases the length of a MAC PDU.

The rate matching unit 105 receives a MAC PDU with an FEC code added thereto, input from the FEC configuration unit 103, and determines a rate suitable to transmit the input MAC PDU. If the transmitting apparatus 101 uses an Enhanced Variable Rate Codec (EVRC) scheme, then the rate matching unit 105 may select one of full rate, half (½) rate, quarter (¼) rate, and eighth (⅛) rate. The interleaver 107 receives a MAC PDU input from the rate matching unit 105, and interleaves the input MAC PDU in order to prevent burst errors. The modulator 109 receives an interleaved MAC PDU input from the interleaver 107, and modulates the input MAC PDU in a predefined modulation scheme. Although the transmitting apparatus 101 has been described as using the EVRS scheme, it may also use codec schemes other than the EVRC scheme.

In this way, the transmitting apparatus 101 generates voice data of a fixed length regardless of a rate, and thereby can transmit voice data without causing a fixed resource to be wasted. In addition, although not illustrated in FIG. 1, the transmitting apparatus 101 may transmit a modulated MAC PDU to a receiving apparatus through a transmitter (not illustrated) and an antenna (not illustrated).

Figure 2:
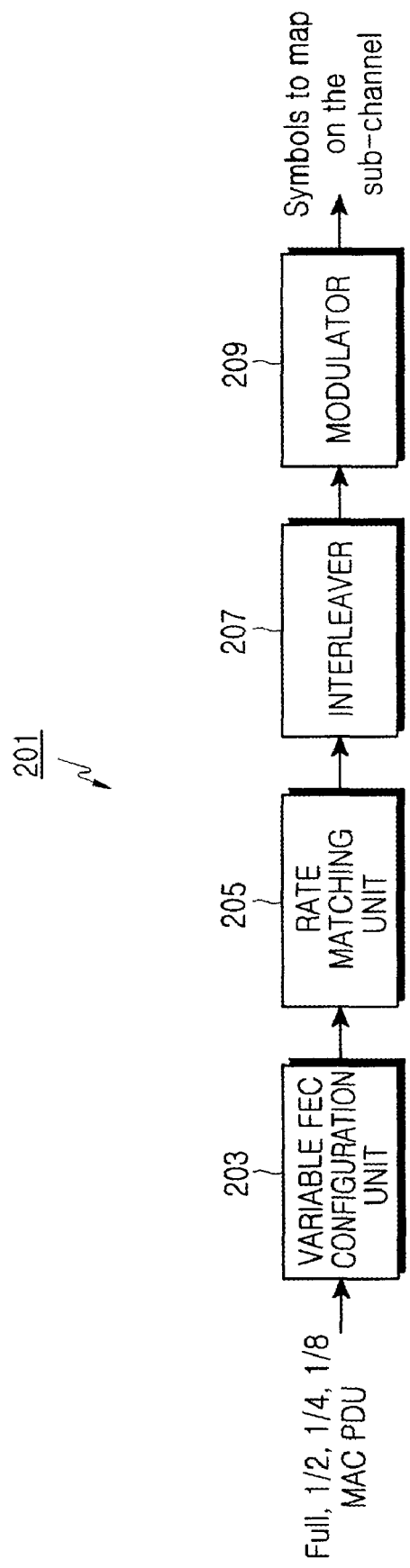
FIG. 2 is a block diagram illustrating a structure of an apparatus for transmitting a voice packet in a wireless communication network in accordance with a second exemplary embodiment of the present invention.

FIG. 2 illustrates a structure of a transmitting apparatus for voice packet transmission in a wireless communication network according to a second exemplary embodiment of the present invention. Referring to FIG. 2, the transmitting apparatus 201 includes a variable FEC configuration unit 203, a rate matching unit 205, an interleaver 207, and a modulator 209. In FIG. 2, it is assumed that the transmitting apparatus 201 allocates a fixed resource to a receiving apparatus, and transmits a voice packet to the receiving apparatus through the allocated fixed resource. Reference will now be made to the respective constituent elements of the transmitting apparatus 201. The variable FEC configuration unit 203 adds an FEC code for transmission error detection and correction to a MAC PDU including an input voice packet. Here, a MAC PDU with an FEC code added thereto is referred to as voice data. In particular, the variable FEC configuration unit 203 fixes the length of a MAC PDU, and varies the length of an FEC code according to the rate of an input MAC PDU. More specially, when an input MAC PDU has a high rate, for example, a rate of 1, there is substantially no fixed resource that is wasted, and thus the variable FEC configuration unit 203 does not vary the length of an FEC code and adds the FEC code with no variation in its length to the input MAC PDU. In contrast, when an input MAC PDU has a low rate, for example, a rate of ⅛, ¼, or ½, there occurs a fixed resource that is wasted, and thus the variable FEC configuration unit 203 varies the length of an FEC code according to the rate and adds the FEC code with a variation in its length to the input MAC PDU. Therefore, the variable FEC configuration unit 203 generates a fixed-length MAC PDU with an FEC code added thereto regardless of the rate of an input MAC PDU.

The rate matching unit 205, the interleaver 207, and the modulator 209 operate in substantially the same manner as the above-mentioned rate matching unit 105, interleaver 107, and modulator 109, so descriptions of their operations will be omitted.

In this way, the transmitting apparatus 201 generates voice data of a fixed length regardless of a rate, and thereby can transmit voice data without causing a fixed resource to be wasted. In addition, although not illustrated in FIG. 2, the transmitting apparatus 201 may transmit a modulated MAC PDU to a receiving apparatus through a transmitter (not illustrated) and an antenna (not illustrated).

Figure 3:
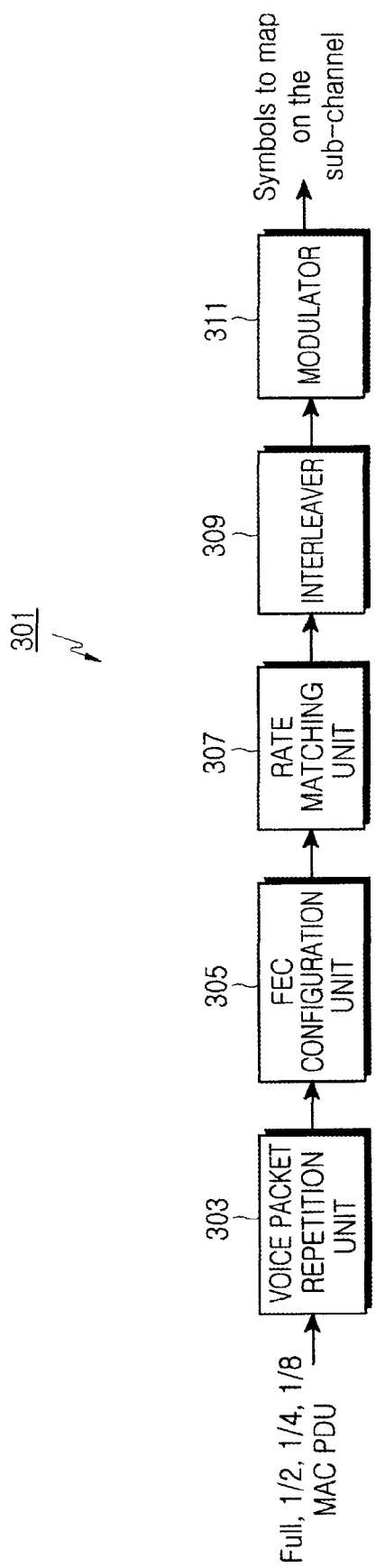
FIG. 3 is a block diagram illustrating a structure of an apparatus for transmitting a voice packet in a wireless communication network in accordance with a third exemplary embodiment of the present invention.

FIG. 3 illustrates a structure of a transmitting apparatus for voice packet transmission in a wireless communication network according to a third exemplary embodiment of the present invention. Referring to FIG. 3, the transmitting apparatus 301 includes a voice packet repetition unit 303, an FEC configuration unit 305, a rate matching unit 307, an interleaver 309, and a modulator 311. In FIG. 3, it is assumed that the transmitting apparatus 301 allocates a fixed resource to a receiving apparatus, and transmits a voice packet to the receiving apparatus through the allocated fixed resource.

Reference will now be made to the respective constituent elements of the transmitting apparatus 301. The voice packet repetition unit 303 repeats a voice packet included in an input MAC PDU according to the rate of the input MAC PDU, and generates a new MAC PDU including the repeated voice packets. More specially, when an input MAC PDU has a high rate, for example, a rate of 1, there is substantially no fixed resource that is wasted, and thus the voice packet repetition unit 303 outputs the input MAC PDU in its entirety. In contrast, when an input MAC PDU has a low rate, for example, a rate of ⅛, ¼, or ½, there occurs a fixed resource that is wasted, and thus the voice packet repetition unit 303 repeats a voice packet included in the input MAC PDU according to the rate of the input MAC PDU, and generates a new MAC PDU including the repeated voice packets. With regard to this, there is an inverse relationship between the rate of an input MAC PDU and number of repetitions of a voice packet. In other words, the lower the rate of an input MAC PDU, the greater the number of times the voice packet repetition unit 303 repeats a voice packet. Therefore, the voice packet repetition unit 303 generates a MAC PDU of a fixed length regardless of the rate of an input MAC PDU.

The FEC configuration unit 305 adds an FEC code for transmission error detection and correction to a MAC PDU input from the voice packet repetition unit 303. Here, a MAC PDU with an FEC code added thereto is referred to as voice data.

The rate matching unit 307, the interleaver 309, and the modulator 311 operate in substantially the same manner as the above-mentioned rate matching unit 105, interleaver 107, and modulator 109, so descriptions of their operations will be omitted.

In this way, the transmitting apparatus 301 generates voice data of a fixed length regardless of a rate, and thereby can transmit voice data without causing a fixed resource to be wasted. In addition, although not illustrated in FIG. 3, the transmitting apparatus 301 may transmit a modulated MAC PDU to a receiving apparatus through a transmitter (not illustrated) and an antenna (not illustrated).

Figure 4:
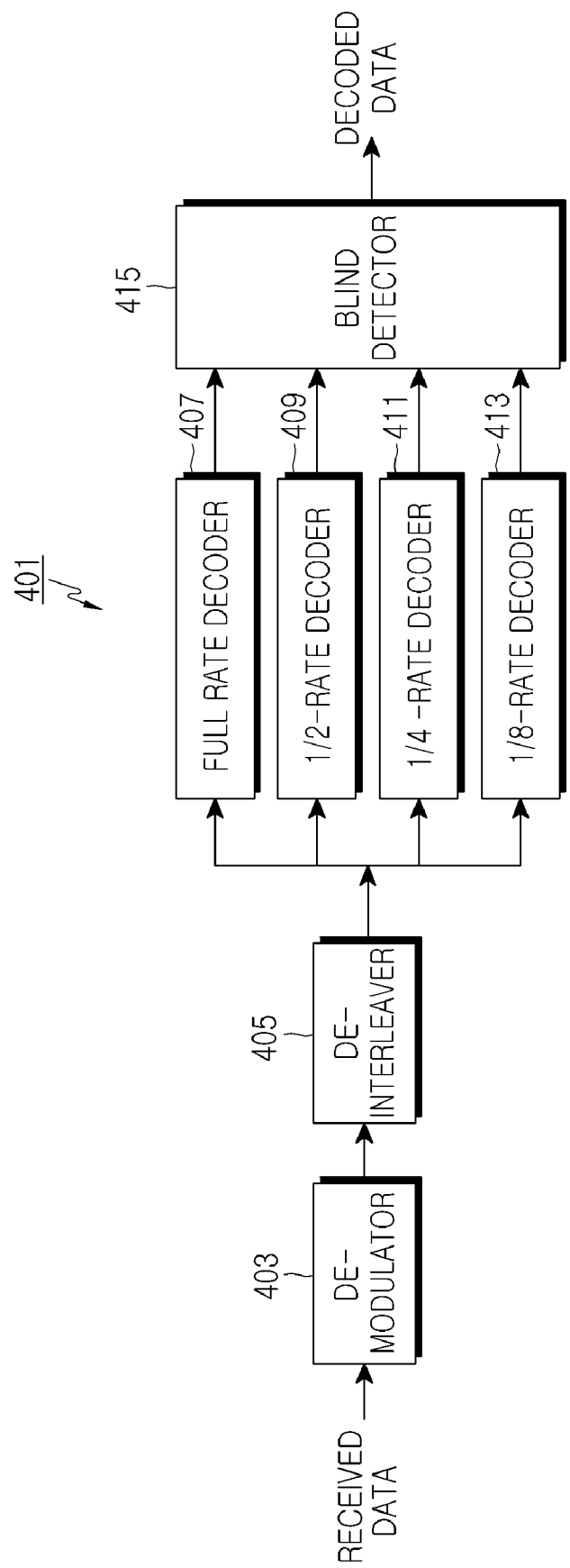
FIG. 4 is a block diagram illustrating a structure of an apparatus for receiving a voice packet in a wireless communication network in accordance with an exemplary embodiment of the present invention.

FIG. 4 illustrates a receiving apparatus for voice packet reception in a wireless communication network according to an exemplary embodiment of the present invention. Referring to FIG. 4, the receiving apparatus 401 includes a demodulator 403, a deinterleaver 405, a full-rate decoder 407, a ½ rate decoder 409, a ¼ rate decoder 411, a ⅛ rate decoder 413, and a blind detector 415.

Reference will now be made to the respective constituent elements of the receiving apparatus 401. The demodulator 403 demodulates received data in a demodulation scheme corresponding to a modulation scheme used in a transmitting apparatus, thereby generating a MAC PDU. The deinterleaver 405 deinterleaves a MAC PDU in a deinterleaving scheme corresponding to an interleaving scheme used in the transmitting apparatus, and outputs the deinterleaved MAC PDU to the full rate decoder 407, the ½ rate decoder 409, the ¼ rate decoder 411, and the ⅛ rate decoder 413. Each of the full rate decoder 407, the ½ rate decoder 409, the ¼ rate decoder 411, and the ⅛ rate decoder 413 decodes a deinterleaved MAC PDU according to its rate, and outputs the decoded MAC PDU to the blind detector 415. The blind detector 415 detects one of decoded MAC PDUs received from the full-rate decoder 407, the ½ rate decoder 409, the ¼ rate decoder 411, and the ⅛ rate decoder 413. With regard to this, when a MAC PDU is transmitted as described in FIG. 1, the blind detector 415 detects a decoded MAC PDU by using energy detection and a Cyclic Redundancy Check (CRC). In addition, when a MAC PDU is transmitted as described in FIG. 2 or 3, the blind detector 415 detects a decoded MAC PDU by using a CRC.

Although not illustrated in the accompanying drawings, methods corresponding to FIGS. 1 to 3 will be described hereinafter.

In a method corresponding to FIG. 1, the transmitting apparatus 101 adds an FEC code for transmission error detection and correction to a MAC PDU including a voice packet. With regard to this, the transmitting apparatus 101 adds an FEC code of a fixed length to a MAC PDU, and variably adjusts the length of the MAC PDU according to the rate of a voice packet included therein. More specially, when a voice packet has a high rate, for example, a rate of 1, there is substantially no fixed resource that is wasted, and thus the transmitting apparatus 101 maintains the length of a MAC PDU in its entirety. In contrast, when a voice packet has a low rate, for example, a rate of ⅛, ¼, or ½, there occurs a fixed resource that is wasted without actually carrying a voice packet, and thus the transmitting apparatus 101 increases the length of a MAC PDU.

In addition, the transmitting apparatus 101 determines the rate of the voice packet in order to transmit the MAC PDU with the FEC code added thereto. If the EVRC scheme is used, then the transmitting apparatus 101 may select one of full rate, ½ rate, ¼ rate, and ⅛ rate. Further, the transmitting apparatus 101 interleaves the MAC PDU in order to prevent burst errors. Additionally, the transmitting apparatus 101 modulates the interleaved MAC PDU in a predefined modulation scheme, and then transmits the modulated MAC PDU to a receiving apparatus.

In a method corresponding to FIG. 2, the transmitting apparatus 201 adds an FEC code for transmission error detection and correction to a MAC PDU including a voice packet. With regard to this, the transmitting apparatus 201 fixes the length of a MAC PDU, and varies the length of an FEC code according to the rate of an input MAC PDU. More specially, when an input MAC PDU has a high rate, for example, a rate of 1, there is substantially no fixed resource that is wasted, and thus the transmitting apparatus 201 does not vary the length of an FEC code and adds the FEC code with no variation in its length to the input MAC PDU. In contrast, when an input MAC PDU has a low rate, for example, a rate of ⅛, ¼, or ½, there occurs a fixed resource that is wasted, and thus the transmitting apparatus 201 varies the length of an FEC code according to the rate and adds the FEC code with variation in its length to the input MAC PDU. Therefore, the transmitting apparatus 201 generates a fixed-length MAC PDU with an FEC code added thereto regardless of the rate of an input MAC PDU.

In addition, the transmitting apparatus 201 determines a rate suitable to transmit the MAC PDU with the FEC code added thereto. Further, the transmitting apparatus 201 interleaves the MAC PDU in order to prevent burst errors. Additionally, the transmitting apparatus 201 modulates the interleaved MAC PDU in a predefined modulation scheme, and then transmits the modulated MAC PDU to a receiving apparatus.

In a method corresponding to FIG. 3, the transmitting apparatus 301 repeats a voice packet included in a MAC PDU according to the rate of the MAC PDU, and generates a new MAC PDU including the repeated voice packets.

More specially, when an input MAC PDU has a high rate, for example, a rate of 1, there is substantially no fixed resource that is wasted, and thus the transmitting apparatus 301 outputs the input MAC PDU in its entirety. In contrast, when an input MAC PDU has a low rate, for example, a rate of ⅛, ¼, or ½, there occurs a fixed resource that is wasted, and thus the transmitting apparatus 301 repeats a voice packet included in the input MAC PDU according to the rate of the input MAC PDU, and generates a new MAC PDU including the repeated voice packets. With regard to this, there is an inverse relationship between the rate of an input MAC PDU and number of repetitions of a voice packet. In other words, the lower the rate of an input MAC PDU, the greater the number of times the transmitting apparatus 301 repeats a voice packet. Therefore, the transmitting apparatus 301 generates a MAC PDU of a fixed length regardless of the rate of an input MAC PDU.

In addition, the transmitting apparatus 310 adds an FEC code for transmission error detection and correction to the MAC PDU. Further, the transmitting apparatus 301 determines a rate suitable to transmit the MAC PDU with the FEC code added thereto. Additionally, the transmitting apparatus 301 interleaves the MAC PDU in order to prevent burst errors. Further, the transmitting apparatus 301 modulates the interleaved MAC PDU in a predefined modulation scheme, and then transmits the modulated MAC PDU to a receiving apparatus.

As describe above, exemplary embodiments of the present invention can reduce system overhead caused by transmission of resource allocation information for a voice service, and prevent a waste of resources for a voice service.

While the invention has been shown and described with reference to certain exemplary embodiments thereof, it will be understood by those skilled in the art that various changes in form and details may be made therein without departing from the spirit and scope of the invention as defined by the appended claims and equivalents thereof.

What is claimed is:

1. An apparatus for transmitting a packet in a wireless communication network, the apparatus comprising:
   a variable Forward Error Correction (FEC) configuration unit for adjusting a length of a FEC code according to a rate of a Media Access Control Packet Data Unit (MAC PDU), and for generating voice data of a fixed length of bits by adding the length-adjusted FEC code and a length of the MAC PDU; and
   a transmitter for transmitting the generated voice data through a fixed resource.

2. The apparatus of claim 1, wherein the fixed resource comprises a time-frequency resource, and is fixedly allocated to a receiving apparatus during a call setup.

3. The apparatus of claim 1, wherein the generated voice data is coded using an Enhanced Variable Rate Codec (EVRC) scheme.

4. The apparatus of claim 1, wherein the variable FEC configuration unit generates the FEC code having a length that increases as the rate of the MAC PDU is lowered.

5. An apparatus for transmitting a packet in a wireless communication network, the apparatus comprising:
   a voice packet repetition unit for repeating a voice packet included in a Media Access Control Packet Data Unit (MAC PDU) according to a rate of the MAC PDU;
   an FEC configuration unit for generating a voice data of a fixed length of bits by adding a length of a Forward Error Correction (FEC) code and a length of the MAC PDU including the repeated voice packets; and
   a transmitter for transmitting the generated voice data through a fixed resource.

6. The apparatus of claim 5, wherein the voice packet repetition unit repeats the voice packet a greater number of times as the rate of the MAC PDU is lowered.

7. The apparatus of claim 5, wherein the fixed resource comprises a time-frequency resource, and is fixedly allocated to a receiving apparatus during a call setup.

8. The apparatus of claim 5, wherein the generated voice data is coded using an Enhanced Variable Rate Codec (EVRC) scheme.

9. A method of transmitting data in a wireless communication network, the method comprising:
   adjusting a length of a Forward Error correction (FEC) code according to a rate of a Media Access Control Packet Data Unit (MAC PDU);
   generating voice data of a fixed length of bits by adding the length-adjusted FEC code and a length of the MAC PDU; and
   transmitting the generated voice data through a fixed resource.

10. The method of claim 9, wherein the fixed resource comprises a time-frequency resource, and is fixedly allocated to a receiving apparatus during a call setup.

11. The method of claim 9, wherein the generated voice data is coded using an Enhanced Variable Rate Codec (EVRC) scheme.

12. The method of claim 9, wherein the adjusting of the length of the FEC code comprises generating the FEC code having a length that increases as the rate of the MAC PDU is lowered.

13. A method of transmitting data in a wireless communication network, the method comprising:
   repeating a voice packet included in a Media Access Control Packet Data Unit (MAC PDU according to a rate of the MAC PDU;
   generating a voice data of a fixed length of bits by adding a length of a Forward Error Correction (FEC) code and a length of MAC PDU including the repeated voice packets; and
   transmitting the generated voice data through a fixed resource.

14. The method of claim 1, wherein the repeating of the voice packet comprises repeating the voice packet a greater number of times as the rate of the MAC PDU is lowered.

15. The method of claim 1, wherein the fixed resource comprises a time-frequency resource, and is fixedly allocated to a receiving apparatus during a call setup.

16. The method of claim 1, wherein the generated voice data is coded using an Enhanced Variable Rate Codec (EVRC) scheme.

* * * * *